(12) United States Patent
Sisley

(10) Patent No.: US 8,259,860 B1
(45) Date of Patent: *Sep. 4, 2012

(54) IDENTIFICATION OF TARGET SIGNALS IN RADIO FREQUENCY PULSED ENVIRONMENTS

(75) Inventor: Brandon Sisley, Greenwood, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1404 days.

This patent is subject to a terminal disclaimer.

(21) Appl. No.: 11/900,141

(22) Filed: Aug. 31, 2007

(51) Int. Cl.
*H03D 3/22* (2006.01)

(52) U.S. Cl. ........ 375/329; 375/130; 375/136; 375/279; 375/308

(58) Field of Classification Search ................... 375/330, 375/130, 136, 279, 308, 329
See application file for complete search history.

(56) References Cited

U.S. PATENT DOCUMENTS

| | | | |
|---|---|---|---|
| 4,597,107 A | 6/1986 | Ready et al. | |
| 4,876,737 A | 10/1989 | Woodworth et al. | |
| 6,124,758 A | 9/2000 | Korte et al. | |
| 6,426,675 B1 | 7/2002 | Salzmann | |
| 7,940,866 B2 | 5/2011 | Yuan et al. | |
| 8,031,059 B2 | 10/2011 | Rollins et al. | |
| 2005/0265292 A1 | 12/2005 | Atsuta | |
| 2005/0281214 A1 | 12/2005 | Misra et al. | |
| 2006/0063543 A1 | 3/2006 | Matoba et al. | |
| 2006/0238350 A1 | 10/2006 | Tessier | |
| 2007/0192048 A1 | 8/2007 | Hu et al. | |
| 2008/0304602 A1 | 12/2008 | Kim et al. | |
| 2009/0037959 A1 | 2/2009 | Suh et al. | |
| 2009/0046815 A1 | 2/2009 | Oh et al. | |
| 2009/0060044 A1 | 3/2009 | Suh et al. | |
| 2009/0067481 A1* | 3/2009 | Sisley et al. | 375/224 |
| 2009/0203337 A1* | 8/2009 | Sisley et al. | 455/226.1 |
| 2010/0179761 A1 | 7/2010 | Burtz et al. | |
| 2011/0103463 A1 | 5/2011 | Kim et al. | |

* cited by examiner

*Primary Examiner* — Dhaval Patel

(74) *Attorney, Agent, or Firm* — Christopher A. Monsey

(57) ABSTRACT

A system, method of processing and method of manufacturing related to a signal processing scheme which receives multiple inputs and performs signal correlation to identify a predetermined signal based on a specific modulation type such as phase shift key or quadrature modulation related signal characteristics.

35 Claims, 10 Drawing Sheets

THEORETICAL QPSK MODULATION AND CVR RECEPTION SIGNALS

ACTUAL PSK RF SIGNAL

FIG-4 ACTUAL CVR VIDEO SIGNAL

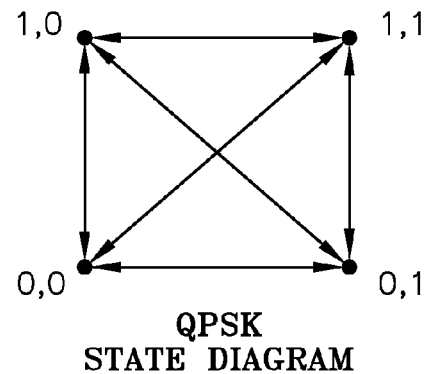
QPSK
STATE DIAGRAM
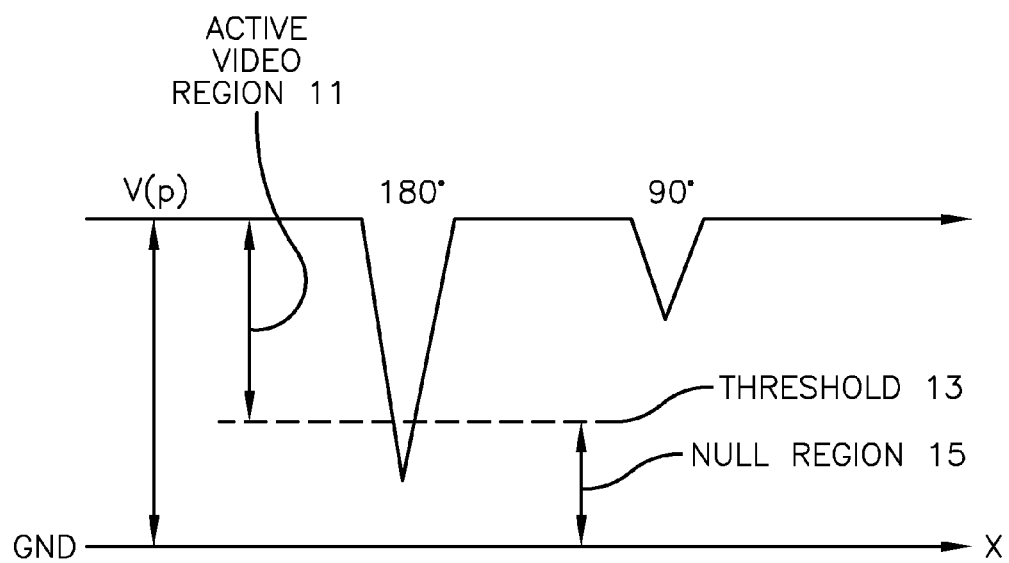
FIG-5

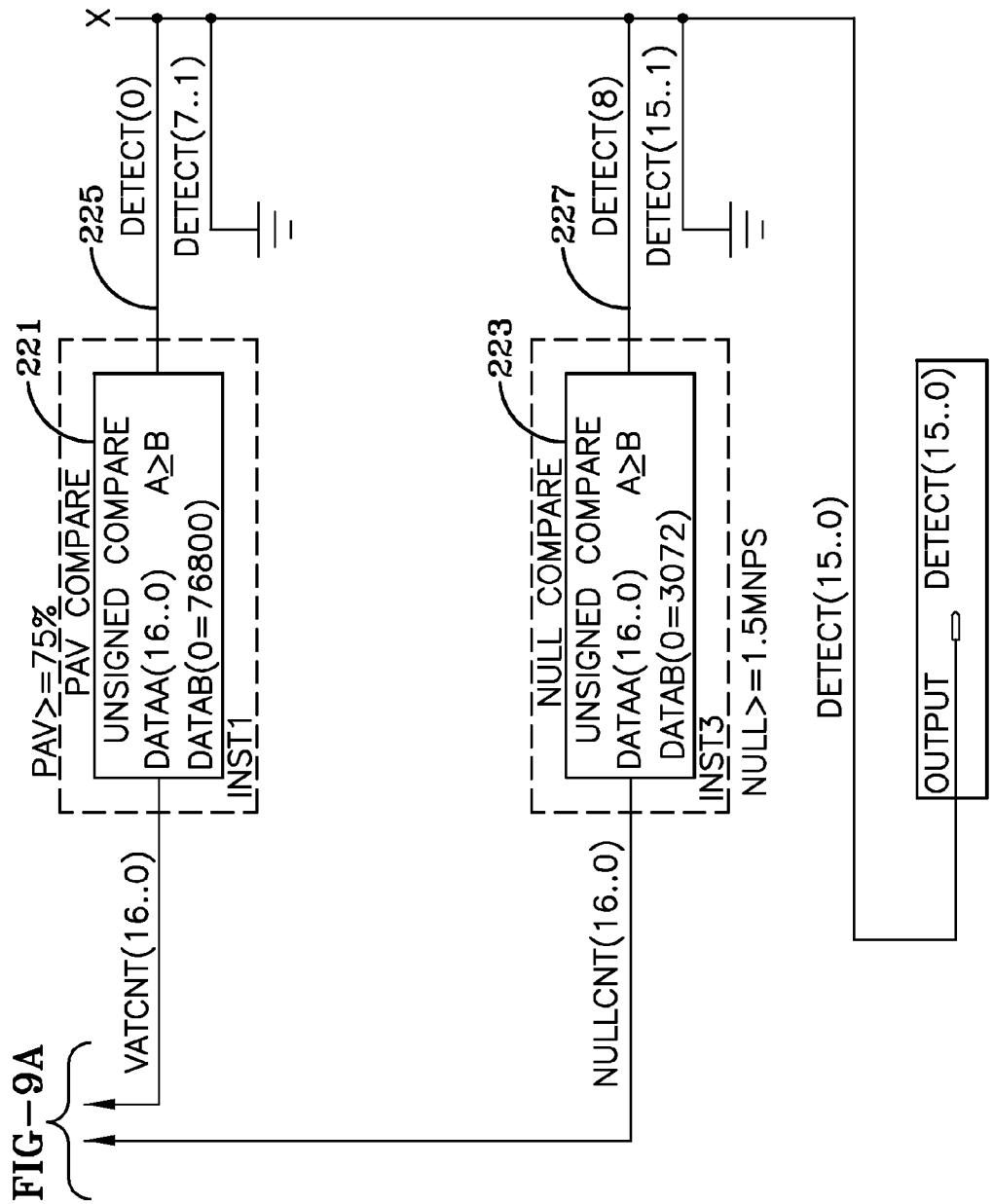

IDENTIFICATION OF TARGET SIGNALS IN RADIO FREQUENCY PULSED ENVIRONMENTS

STATEMENT REGARDING FEDERALLY SPONSORED RESEARCH OR DEVELOPMENT

The invention described herein was made in the performance of official duties by an employee of the Department of the Navy and may be manufactured, used, licensed by or for the United States Government for any governmental purpose without payment of any royalties thereon.

FIELD OF THE INVENTION

The invention relates generally to the identification of the presence of a specific type of modulated signals such as, for example, phase modulation. In particular, the invention includes a signal processing scheme which uses the power level of a signal to determine the presence of a phase shifted keying (PSK) modulated signal.

BACKGROUND OF THE INVENTION

Many application use crystal video receivers (CVR), diode detector circuits, or other circuits that simply create a signal, commonly called video, that represents the power level of the received signal. Such receiver circuitry is commonly used to process radio frequency (RF) pulse signals because of its simplicity and low cost. These receivers have difficulty yielding meaningful results when dealing with continuous wave (CW) modulated signals. Because of this, CW modulated signals are either avoided or removed from the CVR and similar receivers reception path. Increasing use of communication systems both mobile and stationary has led to an ever changing and complex RF spectrum. Digital modulation schemes that use phase PSK are among the most popular. Accordingly, a system that identifies reception of PSK in video signals could be used to address problems of processing signals not attended to be analyzed or to activate a more sophisticated signal processing system to analyze the original signal.

SUMMARY OF THE INVENTION

A processing system, method of processing and method of manufacturing of a system to identify the reception of PSK modulated signals. The invention provides a capability to identify certain modulated signal types.

BRIEF DESCRIPTION OF THE DRAWINGS

FIG. 5 shows another representation of a signal with QPSK modulation;

DETAILED DESCRIPTION OF THE INVENTION

In one embodiment of the invention, CVRs are used as RF signal processors that converts, by crystal detection, an RF modulated signal to an audio or video signal corresponding to the envelope of the signal's RF energy and amplifies it to detection values. CVRs are used in a variety of RF receives including radar detection systems. PSK is a digital communication modulation type in which the phase of the transmitted signal is varied to convey information. There are several different methods used to accomplish PSK. Each method sends a "symbol" based on the desired digital data. Each symbol differs only in the phase of the RF carrier. There are several PSK schemes that differ by the number of discrete "symbols" and how they implement the transition between the symbols. Equation 1 describes a PSK modulated signal that represents an individual symbol.

$$\mathrm{Sin}(\omega_c t + \Phi_d) \qquad (1)$$

Referring to Equation 1, $\omega_c$ is the carrier frequency, t is time and $\Phi_d$ is the symbol phase shift determined by digital data. It is common practice to rewrite equation 1 using orthogonal symbols in-phase (I) and quadrature-phase (Q). Modulators create a PSK signal by varying the amplitude off the I and Q signals. Equation 1 can be written as shown by equation 2 and equation 3 to produce equation 4 as shown below.

$$I = \sin(\omega_c t) \qquad (2)$$

$$Q = \cos(\omega_c t) \qquad (3)$$

$$\mathrm{Sin}(\omega_c t + \Phi_d) = I^* \cos(\Phi_d) + Q^* \sin(\Phi_d) \qquad (4)$$

Some common PSK types are binary-PSK (BPSK), quadrature-PSK (QPSK) and 8PSK also called octal-PSK. BPSK has two different symbols corresponding to one bit of data that are 180° apart. QPSK has four different symbols corresponding to two bits of data placed 90° apart. 8 PSK has four different symbols corresponding to three bits of data placed 45° apart.

Figure 1:
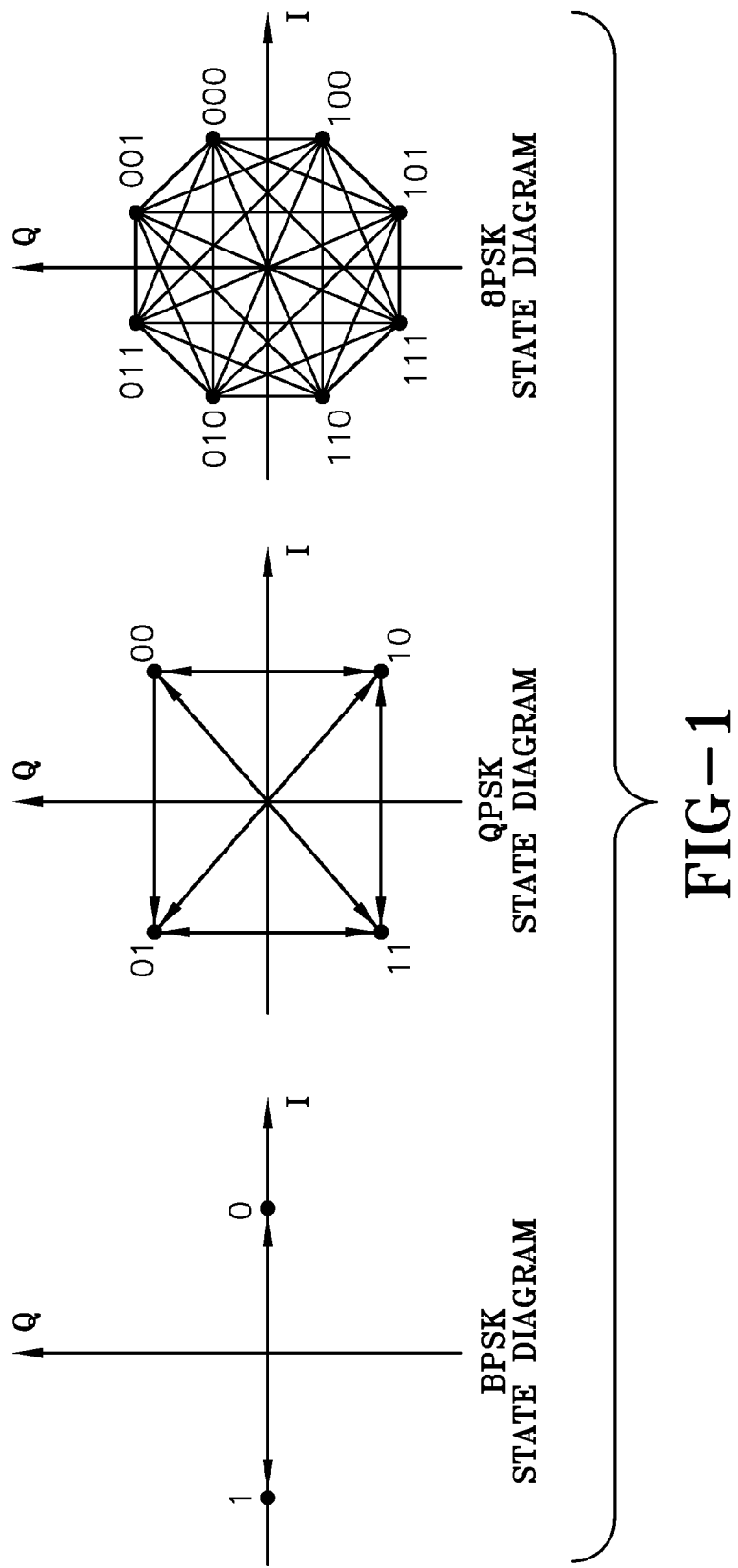
FIG. 1 shows a phase shift key (PSK) state diagram.

The I vs. Q state maps of these modulation types are displayed in FIG. 1. The resultant signal magnitude and phase is represented with a vector emanating from the origin of a desired location on the state diagram. As shown in FIG. 1, each symbol PSK modulation method theoretically has the same magnitude or power. However, when transitioning from one symbol to another, the power level changes. When making a 180° transition, the power drops to zero as the state transition path goes through the origin. Since CVRs are essentially transforming power into a video signal, the video signal drops at symbol transitions.

Figure 2:
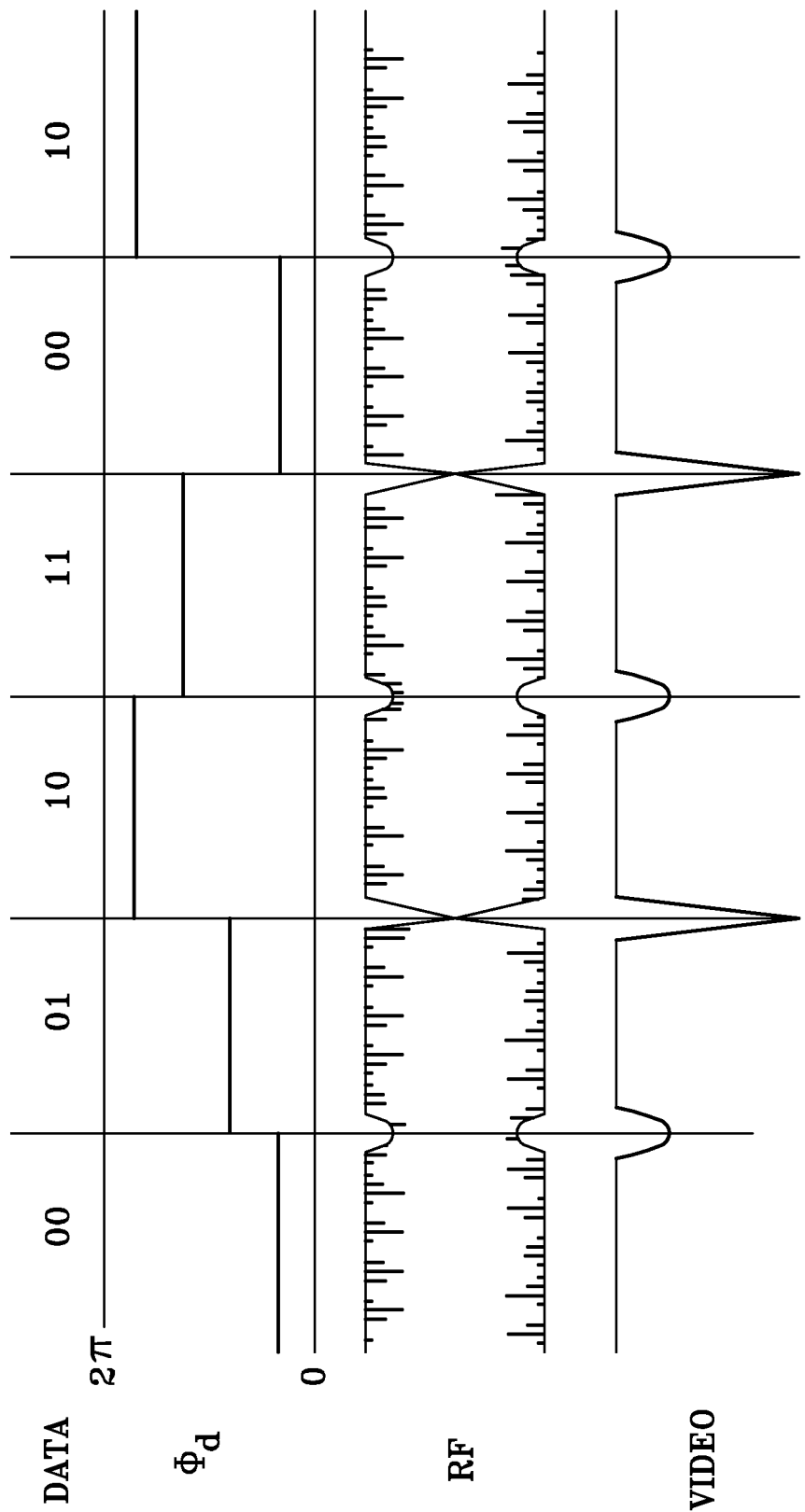
FIG. 2 shows a quadrature phase shift key (QPSK) modulation and CVR reception signals.
Figure 3:
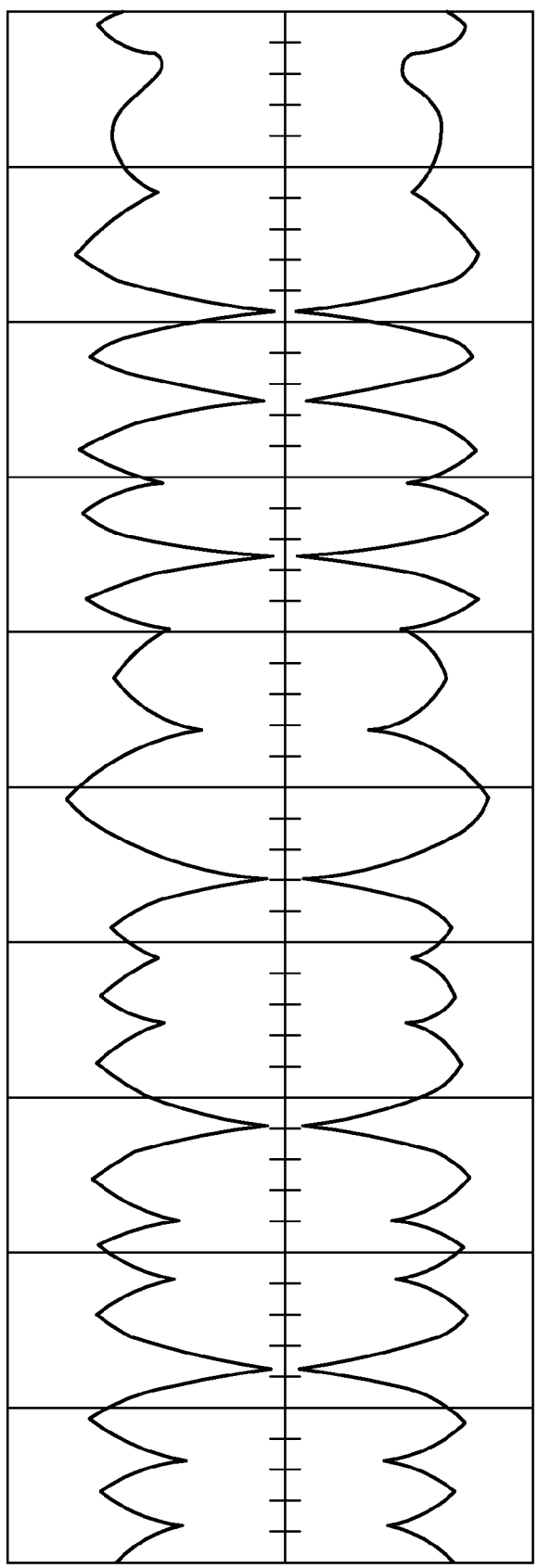
FIG. 3 shows a sample PSK RF signal.
Figure 4:
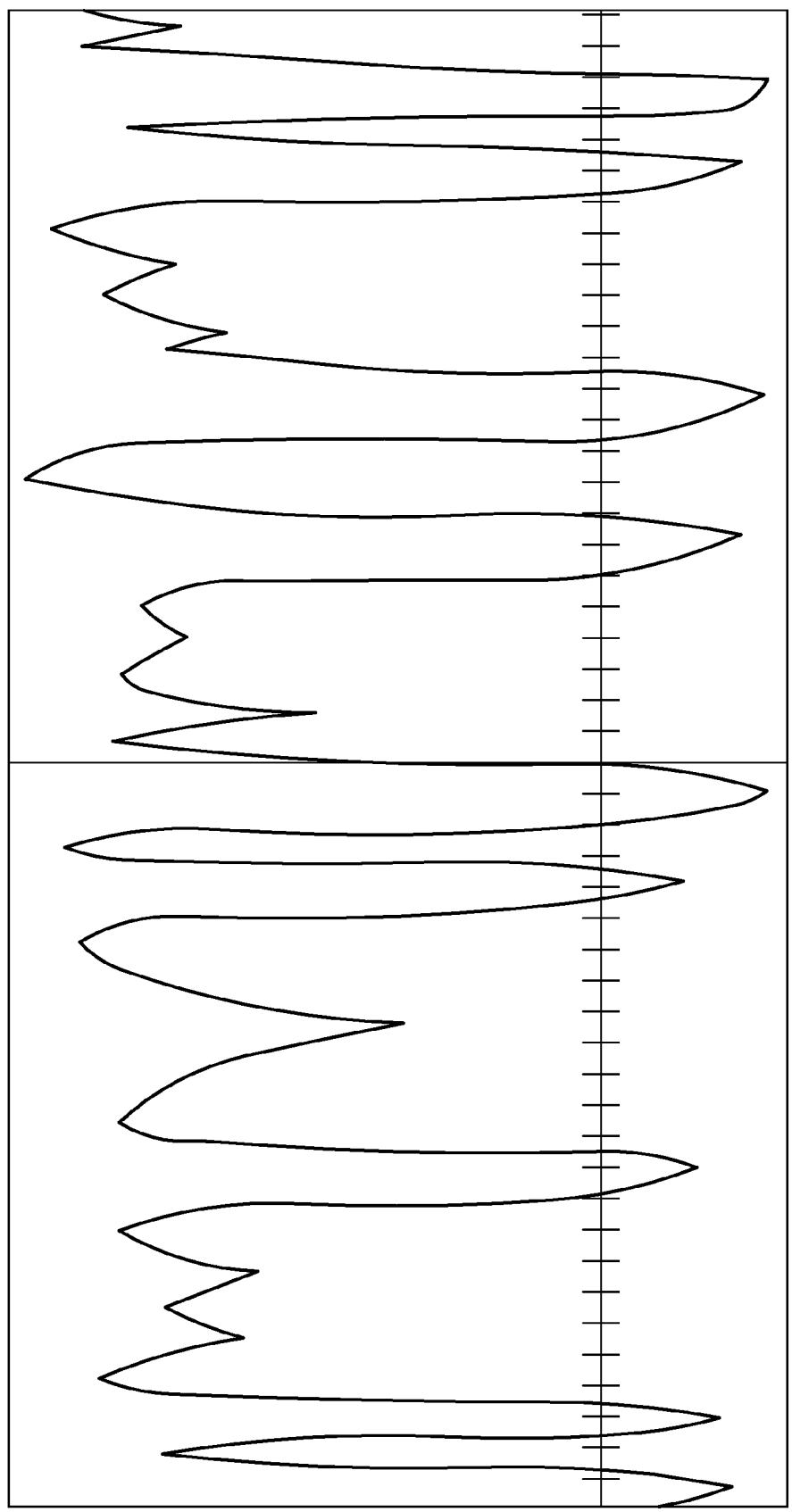
FIG. 4 shows an exemplary CVR video signal.

FIG. 2 shows a QPSK modulation and CVR reception signals demonstrating how a CVR turns QPSK signals into a video signal. Theoretically, the carrier phase shift at the symbol transitions would be instantaneous. However, when implemented with real world circuitry, time is required to perform the phase shift which also causes fluctuations in the overall power level of the signal. FIG. 3 shows an oscilloscope sample of an actual PSK signal (the actual RF carrier wave is not seen due to bandwidth limitations of the oscilloscope) and FIG. 4 shows an oscilloscope sample of an actual PSK signal after conversion to a CVR video signal output.

FIG. 5 shows another representation of a signal with QPSK modulation. Active video in this embodiment is defined as an active video region 11 and a null region 15 is an inactive video area. An active video or null signal can be Boolean signals that represent the portions of video that adhere to a predefined condition or conditions. In particular, active video signal in this example is identified when a signal voltage value exceeds a reference threshold value 13, in this case a voltage threshold determined based at least in part on noise levels found in a sampled signal. Null portions can be identified as portion of video below the threshold value 13.

Research was conducted to examine the impacts of multiple PSK signals on CVR video. The research consisted of capturing CVR video with a variety of PSK signal being injected into the CVR. The following aspects of PSK signals were studied: RF carrier frequency; RF carrier amplitude; modulation type (BPSK, QPSK, 8PSK, 16PSK and OQPSK) and symbol rate. Research showed at slow to medium data rates, a video signal was characterized by short nulls at symbol transitions that had a large phase shift and minor dips in voltage level for small phase transitions. This makes the presence of the PSK modulated signal detectable by looking for percent of active video ranges to be between 70% and 95%. Non-communication signals normally have a much lower duty cycle. At higher data rates, the traditional video response of the CVR begins to break down due to response limitations of the CVR. The null periods become much longer and the percent of active video starts to decrease. However, since symbol transitions happen much faster, the number of nulls greatly increases. At the higher data rates, the presence of PSK modulated signal is detectable by the large number nulls. Based on this research, a signal detection algorithm was created to detect a PSK signal which has been processed by a CVR.

One exemplary detection algorithm was implemented for a PSK signal. First, a voltage threshold was set just above a CVR video noise floor. Video above the threshold was considered active video while voltage output from the CVR below the threshold is considered inactive video. Periods of inactive video are referred to in this embodiment as "nulls". Next, an examination of CVR video output signal is conducted for a predetermined amount of time, for this example approximately two milliseconds (ms). A percentage of active video and nulls per unit time, e.g., seconds, is analyzed. If the percent of active video is above a threshold (e.g., 75 percent) or if the nulls per second are above a set number (e.g., 1.5 million nulls per second (MNPS)), then a signal is declared to be a PSK modulated signal.

Figure 6:
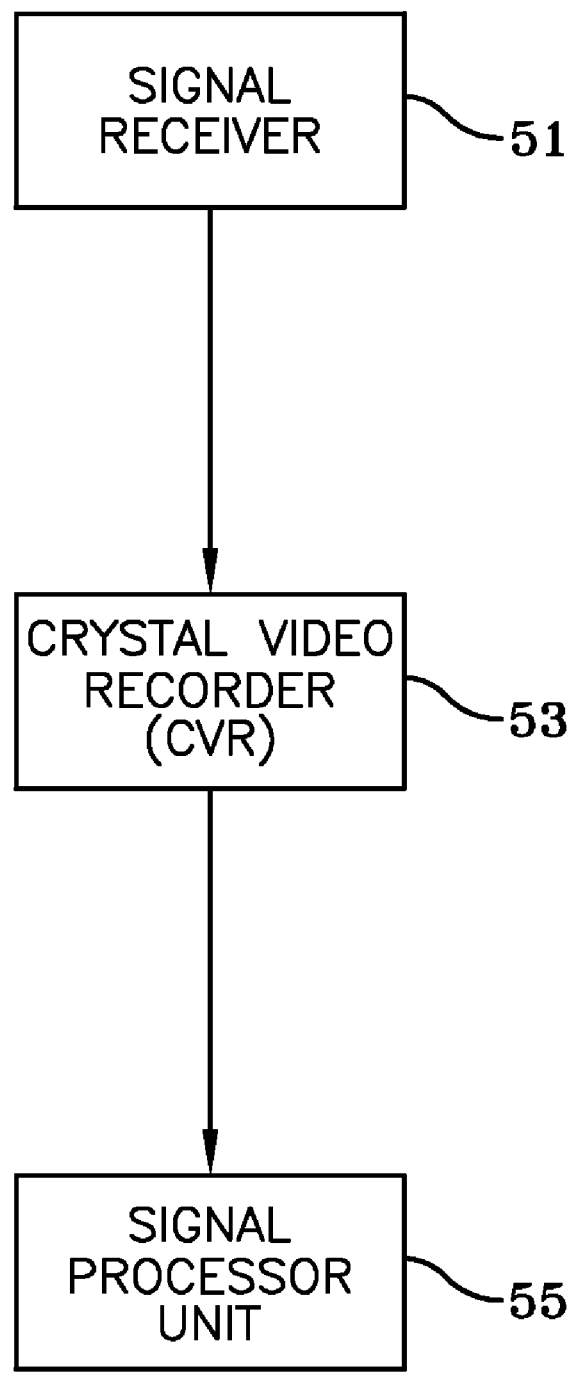
FIG. 6 shows an apparatus with one exemplary embodiment of the invention.

FIG. 6 shows an exemplary embodiment of the invention where a signal receiver 51, e.g., a radio frequency antenna, is coupled to a CVR 53. The output of the CVR 53 is input into a signal processor 55 with an exemplary embodiment of the invention.

Figure 7:
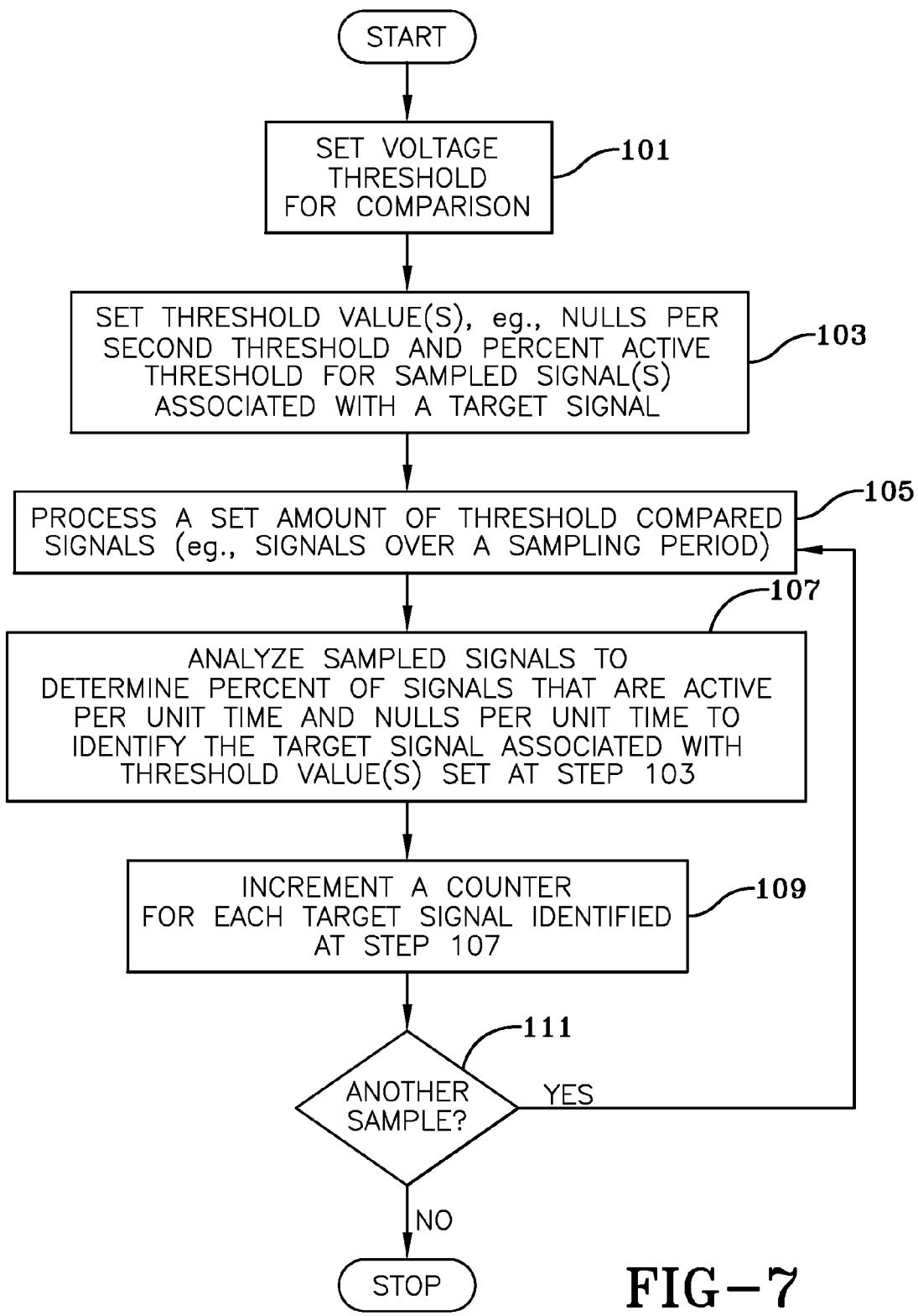
FIG. 7 shows an exemplary method of processing in accordance with one embodiment of the invention.

FIG. 7 shows an exemplary processing sequence for identifying a target signal in a radio frequency pulsed environment using a CVR system. At processing step 101, a voltage threshold is set which is determined based upon ambient noise signal levels produced by the CVR where signals above the threshold are considered active CVR video signals. Hysteresis may be applied to threshold level to reduce or eliminate the effects of noisy signals at the threshold level. Hysteresis causes the threshold to be slightly higher when video is below the threshold. At processing step 103, phase related signal characteristics of nulls per second and percent active CVR video signals (e.g., 1.5 MNPS and 80% active CVR video signals) are set. At processing step 105, a sample of the CVR video signal is taken over a sampling period, such as 2 ms, is taken. At processing step 107, a statistical analysis of the CVR video signal is performed including determination of percent active and nulls per second using the phase related signal characteristics from processing step 103. In other words, analysis at this step can include analyzing threshold compared signals to determine signal characteristics such as percent of signal that is active per unit time and nulls per unit time thus calculating characteristic values for each sampled signal. At processing step 109, measured signal characteristics are compared to thresholds set in step 103 to determine and report the presence of PSK signal. In other words, for example, processing at this step can include comparison of signal characteristics or values produced from statistical analysis from Step 107 to threshold values set at Step 103 to determine and report the identification or presence of a target signal, such as e.g., a PSK signal. Incidence and other characteristics such as amplitude of target signals can be recorded in a counter at this step. At processing step 111, a determination is made of whether another signal is to be processed or reprocessed (e.g., analyze another signal for PSK detection); if yes, then processing resumes at processing step 105; if no, then processing halts. Results from this process include a determination of whether or not a target signal, e.g. a PSK signal, was present in the sampled signal, e.g., CVR video signal. Additional data can be recorded at step 109 such as nulls per unit time and percent active video (e.g., assuming a voltage signal threshold X for a video signal input, time period actually above the voltage signal threshold X divided by a specified time period). For example, if a signal threshold of 6 mv is exceeded for 30 ms over a 60 ms measurement time period, analysis would calculate a 50% percent active video statistic.

Phase related signal characteristics set at step 103 can also be on duration of pulses such as max high duration, average high duration. modulation type (e.g., BPSK, QPSK, 8PSK, 16PSK, OQPSK) or antenna power levels at a transmitter which is producing a target signal versus signals received at a receiver antenna.

Figure 8:
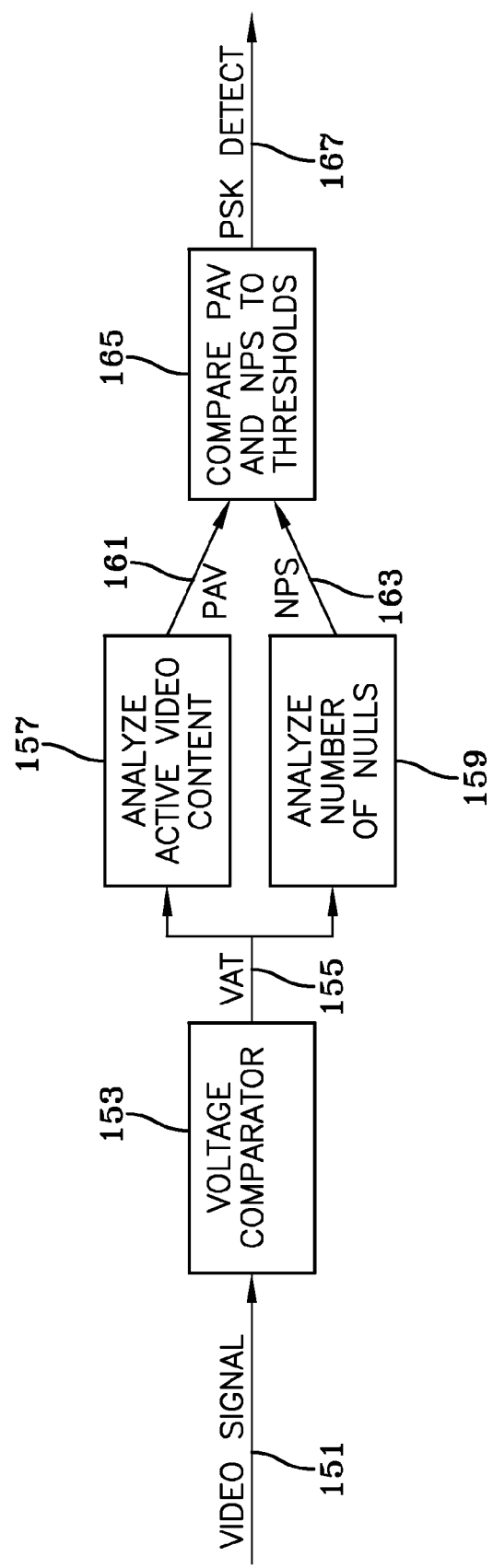
FIG. 8 shows a functional block diagram of one embodiment of the invention.

FIG. 8 shows a functional block diagram of one embodiment of the invention. Video Signal 151 is the output of a CVR or similar receiver which creates video based on received RF power level. Signal processor system 153 compares the video voltage level to a threshold to create a Boolean signal 155. Signal processor 153 could consist of either or both analog or digital circuitry. Hysteresis could be used in threshold to eliminate effects of noise close to threshold level. The threshold level is placed above ambient noise levels to demark levels of meaningful reception and no signal. Signal 155 represents Voltage Above Threshold (VAT) by identifying the active video regions. Both signal processor systems 157 and 159 analyze the VAT to calculate signal characteristics. System processor 157 analyzes the input signal for a set amount of time for the active video content and creates a measure. Percent Above Video (PAV) 161 represents such a active video measure. System Processor 159 analyzes the input signal for the same set amount of time as 157 to create a measure of the number of nulls. Nulls Per Second (NPS) 163 represents a null measurement. The signal characteristic measurements 161 and 163 are analyzed by system processor 165 to compare measure values to known references to calculate whether or not the original signal contained PSK modulation. The references or threshold levels are based on known characteristics of PSK signals such as PAV>=75% or NPS>=1.5 million. These references may changes based on individual CVR receiver response characteristics. Signal 167 PSK Detect is a boolean signal simply represents whether or not a PSK signal was detected. System processors 157, 159, and 163 could be implemented using either or a combination of analog circuitry, digital circuitry, or software.

Figure 9A:
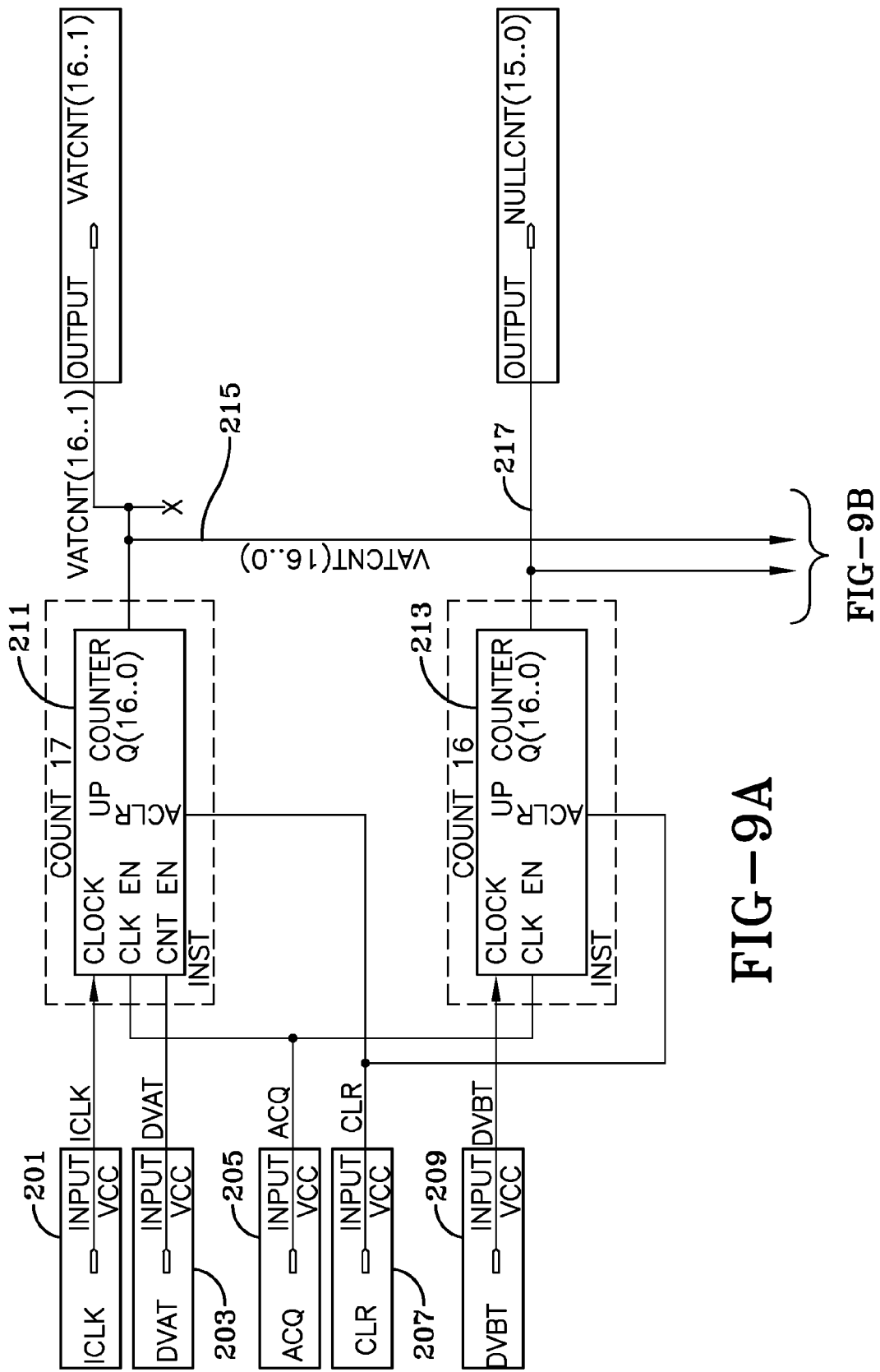
FIG. 9 shows a block diagram of an integrated circuit with one embodiment of the invention.

FIG. 9 shows a block diagram of an integrated circuit with one embodiment of portions of the invention. Signal inputs ICLK 201, DVAT 203, ACQ 205 and CLR 207 are coupled with a signal processor system 211. Inputs ACQ 205, CLR 207 and DVBT 209 are coupled with signal processor system 213. Signal inputs referenced herein in this embodiment are defined as follows:

ICLK=Inverse Clock (clock signal)

DVAT=Digitized Video Above Threshold (e.g., 1 bit analog to digital (A-D) of CVR video)

ACQ=Acquire (signal which is used to define the sample period time)

CLR=Clear (resets the video statistic count to 0 for start of next ACQ period)

DVBT=Digital Video Below Threshold (The inverse of DVAT)

Input DVAT 203 and DVBT 209 are from a signal processor (not shown) which digitizes outputs from a CVR; the signal processor (not shown) receives RF signals and output signals based upon power levels of received power signals comprising active signals and null signals where the active signals are relatively higher than said null signals by a predetermined value; in this case the predetermined value is a noise level of signals received by the signal processor (not shown).

Signal processor 211 is a signal processing system that outputs a data, in this case VACNT 211 (Video Above Count), which is a count of the number of samples above a specified threshold during a predetermined sample period detected in signal input DVAT 203. Signal processor 213 is a signal processing system adapted to output data, in this case signal NULLCNT 217 (Null Count), determined based upon nulls per unit time observed in signal input DVBT 209.

Signal VATCNT 215 is coupled to an input of PAV Compare Signal Processor 221. Signal processor 221 compares VATCNT 215 signal with a predetermined value, in this case PAV>=75%, and outputs signal DETEC(0) 225 if VATCNT 215 exceeds the predetermined value (e.g., PAV>=75%). In this case, the number actually compared is the count number that would equal 75%: total number of samples*0.75.

Signal NULLCNT 217 is coupled to an input of NULL compare signal processor 223. Signal processor 223 compares NULLCNT 217 with a different predetermined value, in this case NULL>=1.5 MNPS, and output signal DETECT (8) 227 if NULLCNT 217 exceeds the predetermined value (e.g., NULL>=1.5 MNPS). In this case, NULLCNT 217 is actually compared to a number that represents the number of nulls required create 1.5 MNPS: 1.5e6*sample time.

A software, hardware or machine implemented detection algorithm can be used to detect the presence of other phase modulated signals in CVR video. Detection algorithms can be software, hardware or a mixed software/hardware implementation. A benefit of the invention is to detect with very simple circuitry the presence of a particular type of modulation which is useful in test systems and signal processing, particularly in cases where filtering of signals is not possible. It should be noted that invention will work for other modulation types, such as many other Quadrature Amplitude Modulation (QAM) schemes, thus the invention is not limited to use in PSK schemes. It should also be noted that the invention can be used with wired system such as phone lines, cable lines, LAN, Internet, etc.

It should be noted that, while exemplary embodiments of the invention have been described and illustrated, the present invention is not to be considered as limited by such descriptions and illustrations but is only limited by the scope of the appended claims.

What is claimed is:

1. A signal processing system comprising:
   a detection circuit comprising:
   a first signal processing portion adapted to receive a plurality of first signals from at least one signal receiver system and output a plurality of second signals based upon power levels of each of said plurality of first signals, wherein said plurality of second signals comprise active signals and null signals where said active signals are relatively higher than said null signals by a first predetermined value;
   a second signal processing portion adapted to output a first data determined based upon nulls per unit time;
   a third signal processing portion adapted to output a second data determined based upon said active signals;
   a fourth signal processing portion adapted to compare said first data with a second predetermined value and output a third data if said first data exceeds said second predetermined value; and
   a fifth signal processing portion adapted to compare said second data with a third predetermined value and output a fourth data if said second data exceeds said third predetermined value.

2. A signal processing system as in claim 1, wherein said first predetermined value is determined based upon a power differential between transition states of a phase shift keyed (PSK) modulated signal.

3. A signal processing system as in claim 1, wherein said second predetermined value is determined based upon a relationship between active and null signals which is represented by a percentage of active signals over a sampling time period.

4. A signal processing system as in claim 3, wherein said percentage of active signals per unit time is set at a point at or between 70 to 95 percent.

5. A signal processing system as in claim 1, wherein said third predetermined value is determined based upon a state transition value which is characteristic of a specific modulation scheme.

6. A signal processing system as in claim 1, wherein said first and second data is a counter output.

7. A signal processing system as in claim 1, wherein said third and fourth data comprise a binary output.

8. A signal processing system as in claim 1, wherein said first signal processing portion is a crystal video receiver.

9. A signal processing system as in claim 1, wherein said second, third, fourth or fifth signal processing portion comprises a field programmable gate array.

10. A signal processing system as in claim 1, wherein said first signal processing portion comprises a wired system, a telecommunication system, a local area network or an Internet system.

11. A method for manufacturing a signal processing system, comprising:
    providing a first signal processing portion adapted to receive a plurality of first signals from at least one signal receiver system and output a plurality of second signals based upon power levels of each of said plurality of first signals, wherein said plurality of second signals comprise active signals and null signals where said active signals are relatively higher than said null signals by a first predetermined value; and
    providing a second signal processing portion adapted to output a first data determined based upon nulls per unit time;
    providing a third signal processing portion adapted to output a second data determined based upon said active signals;

providing a fourth signal processing portion adapted to compare said first data with a second predetermined value and output a third data if said first data exceeds said second predetermined value; and providing a fifth signal processing portion adapted to compare said second data with a third predetermined value and output a fourth data if said second data exceeds said third predetermined value.

12. A method of manufacture as in claim 11, wherein said first predetermined value is determined based upon a power differential between transition states of a phase shift keying modulated signal.

13. A method of manufacture as in claim 11, wherein said second predetermined value is determined based upon a relationship between active and null signals which is represented by a percentage of active signals per unit time.

14. A method of manufacture as in claim 11, wherein said third predetermined value is determined based upon a state transition value which is characteristic of a specific modulation scheme.

15. A method of manufacture as in claim 11, wherein said first and second data is a counter output.

16. A machine implemented signal processing system comprising: a non-transitory computer-readable medium encoded with a computer program comprising plurality of processing sequences comprising a first processing sequence adapted to receive a signal sample that comprises a first, second and third signal from a signal processor system adapted to receive radio frequency signals from an antenna, wherein said first signal is a target signal, said second signal is an ambient noise signal and said third signal is a non-target signal;

a second processing sequence adapted for setting a voltage threshold reference determined based upon an ambient noise signal level in said second signal, where said first and third signal are above the voltage threshold and said second signal is below the voltage threshold;

a third processing sequence adapted for setting a plurality of predetermined phase related signal characteristics for said target signal;

a fourth processing sequence adapted for detecting said target signal based on one or more of said plurality of phase related signal characteristics; and a fifth processing sequence adapted to record an incidence of said target signal;

wherein said phase related signal characteristics for said target signal comprises nulls per unit time and said phase related signal characteristics for said target signal comprises a percentage of active signals versus inactive signals.

17. A machine implemented signal processing system as in claim 16, wherein said signal processor system adapted to receive radio frequency signals from an antenna is a crystal video receiver.

18. A machine implemented signal processing system as in claim 16, wherein one or more of said first through fifth processing sequences are executed by a field programmable gate array.

19. A machine implemented signal processing system as in claim 16, wherein at least one of said first through fifth signal processing sequences are stored in a magnetic, semiconductor or optical storage medium.

20. A machine implemented signal processing system as in claim 16, wherein said target signal is a phase shift keying modulated signal.

21. A machine implemented signal processing system as in claim 16, wherein said percentage of active signals versus inactive signals is set at a value in a range from 70 to 80 percent.

22. A method of signal processing, comprising:

receiving a plurality of first signals from at least one signal receiver system and outputting a plurality of second signals based upon power levels of each of said plurality of first signals, wherein said plurality of second signals comprise active signals and null signals where said active signals are relatively higher than said null signals by a first predetermined value; and outputting a first data determined based upon nulls per unit time;

outputting a second data determined based upon active signals per unit time;

comparing said first data with a second predetermined value and outputting a third data if said first data exceeds said second predetermined value; and comparing said second data with a third predetermined value and outputting a fourth data if said second data exceeds said third predetermined value.

23. A method of signal processing as in claim 22, wherein said first predetermined value is determined based upon a power differential between transition states of a phased shift keying modulated signal.

24. A method of signal processing as in claim 22, wherein said second predetermined value is determined based upon a relationship between active and null signals which is represented by a percentage of active signals per unit time.

25. A method of signal processing as in claim 22, wherein said percentage of active signals per unit time is set within a range from 70 to 95 percent.

26. A method of signal processing as in claim 22, wherein said third predetermined value is determined based upon a state transition value which is characteristic of a specific modulation scheme.

27. A method of signal processing as in claim 22, wherein said first and second data is a counter output.

28. A method of signal processing as in claim 22, wherein said third and fourth data comprise a binary output.

29. A method of signal processing, comprising:

setting a voltage threshold value determined based on ambient noise signal levels present in a signal source where signals wherein signals above said voltage threshold are determined as active signals;

setting phase related signal characteristics comprising a specified nulls per unit time value and a specified percent active signals value;

sampling a plurality of signals from said signal source for a predetermined sampling time period;

analyzing said plurality of signals by calculating a sampled percent active signal value determined by dividing a time period said threshold is exceeded over said predetermined sampling time period;

analyzing said plurality of signals by calculating a sampled null value comprising nulls over said predetermined sampling time period, wherein said nulls per time period are determined by counting the number of times that said threshold is not exceeded over said predetermined sampling time period;

comparing said sampled percent active signal value with said specified percent active signals value and classifying or identifying one or more of said plurality of signals as a target signal if said sampled percent active video signal value equals or exceeds said specified percent active signals value; and comparing said sampled null value with said specified nulls per unit time value and classifying or identifying one or more of said plurality of signals as a target signal if said sampled null value equals or exceeds said specified nulls per unit time value.

30. A method as in claim 29 wherein said specified percent active signals comprises a value within a range from 70 to 95 percent.

31. A method as in claim 29, wherein said specified nulls per unit time value is set at a value at or above one million nulls per unit time.

32. A method as in claim 29, wherein said signal source includes one or more voltage signals produced from a crystal video receiver, said voltage signals can be either analog or digital.

33. A method as in claim 29, wherein said phase related signal characteristics are determined based upon a state transition value which is characteristic of a specific modulation scheme.

34. A method as in claim 29, wherein said phase related signal characteristics are determined based upon a relationship between said active signals and said null signals.

35. A signal processing system as in claim 1, wherein said detection circuit comprises a circuit board having coupled thereto a first programmable logic device, a controller, and a first memory; the first programmable logic device having access to a datastream; the datastream capable of being stored in the first memory; the access by the first programmable logic device to the datastream being controlled by the controller; the datastream capable of being instantiated in the first programmable logic device using programmable logic blocks and interfaces, wherein said second, third, fourth, or fifth signal processing portions are instantiated in said logic blocks or interfaces.

* * * * *